O. S. WILLEY.
Level and Slope Indicator.
No. 159,370.
Patented Feb. 2, 1875.
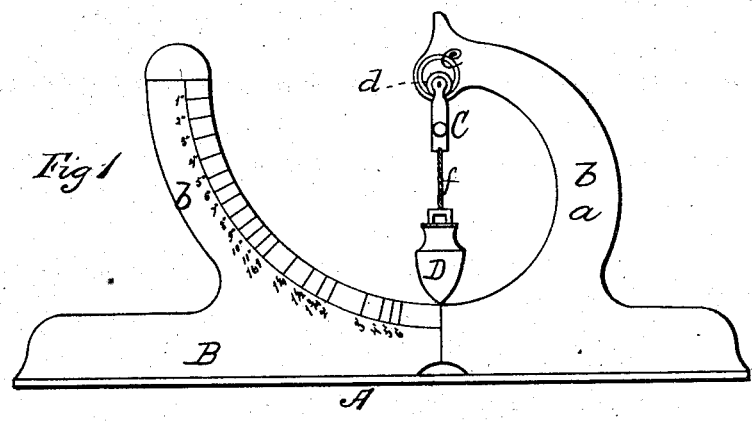
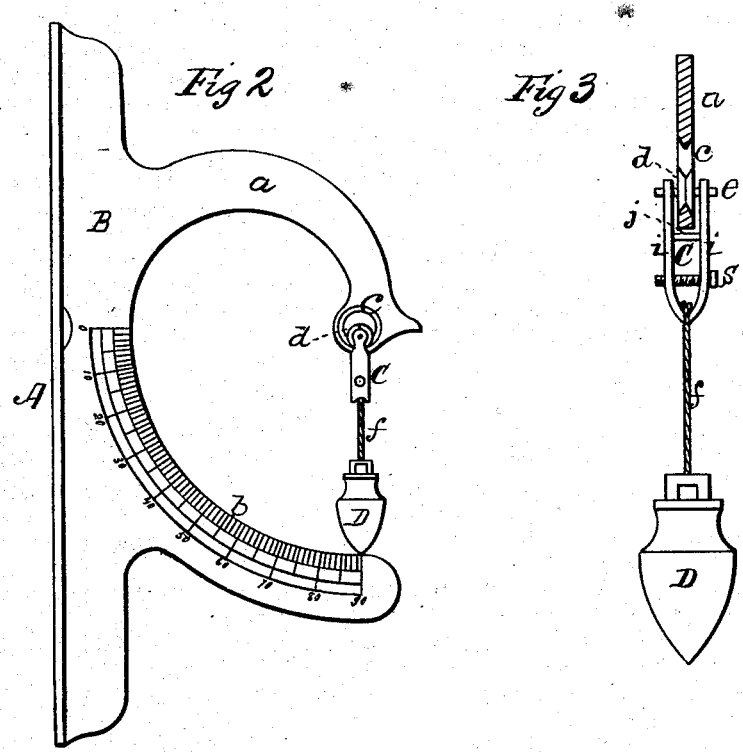
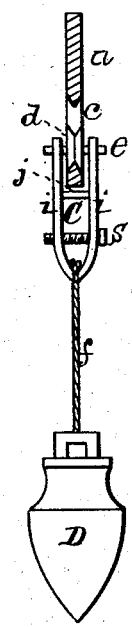
WITNESSES
Mary J. Utley
Frank J. Mass
INVENTOR
Ogden S. Willey
Chipman Hosmer & Co.

UNITED STATES PATENT OFFICE.

OGDEN S. WILLEY, OF KEOKUK, IOWA.

IMPROVEMENT IN LEVEL AND SLOPE INDICATORS.

Specification forming part of Letters Patent No. 159,370, dated February 2, 1875; application filed November 21, 1874.

*To all whom it may concern:*

Be it known that I, OGDEN S. WILLEY, of Keokuk, in the county of Lee and State of Iowa, have invented a new and valuable Improvement in Level and Slope Indicators; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my device resting on a horizontal plane. Fig. 2 is a side view of the same resting on a vertical plane. Fig. 3 is a detail view, showing the hanging of the plumb-weight.

This invention has relation to devices which are designed for indicating the horizontal plane, the vertical plane, and for adjusting anything with reference thereto. The object of the invention is to produce an instrument combining durability and simplicity of construction, with perfect accuracy in determining the vertical, the horizontal plane, or the degree of inclination of any object with reference to either, which shall replace the ordinary spirit-level, which, as is well known to those using the same, is not to be relied upon because of its being more or less affected by changes of temperature, and because of the impossibility of graduating the bubble on both sides of the center-line with absolute accuracy with the eye. To this end the nature of the invention consists in the novel construction and arrangement in connection with a graduated arc and an arm projecting therefrom of a suspended plumb, whereby I am able to accurately determine the exact horizontal and vertical planes or to measure the angle of inclination with reference to either of any rectilinear object, and having an anti-friction wheel having a grooved periphery, which is applied within a circular eye in the free end of the arm supporting the plumb, whereby the same is allowed to gravitate vertically with perfect accuracy, and at the same time without shortening the plumb-line.

In the annexed drawings, A designates the flat broad base of my improved indicator, upon which is rigidly secured, in a vertical plane thereto, a longitudinal strip, B, upon which are erected two projecting arms, the one, $a$, being preferably curved in any suitable arc, while the latter, $b$, is an absolute arc of a circle, of which the radius is the perpendicular distance between a given point in the upper end of the arm $a$ and the upper edge of the arc $b$. This arc, as shown in Fig. 1, is the fourth part of a circle, and it is graduated on one side for degrees and upon the other for minutes and seconds. $c$ designates a circular aperture cut out of the upper overhanging end of the arm $a$, the center of which coincides with the center of the arc $b$, and the edges of which are slightly rounded, or they may be beveled, as shown in Fig. 3. Within this aperture is passed a small grooved wheel, $d$, through the center of which is passed a horizontal shaft, $e$, supporting a clamping device, C, from which is suspended a line, $f$, sustaining upon its lower end a conical plumb-weight, D.

The clamp above referred to consists of two jaws, $i$, suitably braced at $j$, and having upon their upper extremities eyes, through which the shaft $e$ of wheel $d$ passes, as shown in Fig. 3.

The jaws $i$ are actuated to open or close by means of a thumb-screw, $s$, for the purpose of allowing the plumb-line $f$ to be adjusted with nicety at all times, so that it shall be of sufficient length to enable the point of the plumb-weight to touch with the lightest possible contact the upper edge of the arc $b$, as shown in the drawings.

I use my improved indicator in the following manner: To determine the horizontal plane, the instrument is placed in the position shown in Fig. 1, when the point of the plumb will rest at O if the object upon which it is placed is exactly level; and to determine the vertical plane the base of the instrument is placed in the position shown in Fig. 2, when the plumb will rest at ninety degrees if the object is at right angles to the horizontal plane.

What I claim as new, and desire to secure by Letters Patent, is—

In a level and slope indicator, the graduated arc $b$ and inwardly-curved overhanging arm $a$, provided at its outer end with the aperture $c$, in combination with the suspended plumb-weight D, anti-friction wheel $d$, and clamp $c$, having set-screw $s$, substantially as and for the purpose set forth.

In testimony that I claim the above I have hereunto subscribed my name in the presence of two witnesses.

OGDEN S. WILLEY.

Witnesses:
G. L. HINSKAMP,
J. B. BENNETT.